(12) United States Patent
Liu et al.

(10) Patent No.: US 11,887,605 B2
(45) Date of Patent: Jan. 30, 2024

(54) VOICE PROCESSING

(71) Applicant: Alibaba Group Holding Limited, Grand Cayman (KY)

(72) Inventors: Gang Liu, Bellevue, WA (US); Yunfeng Xu, Hangzhou (CN); Tao Yu, Bellevue, WA (US); Zhang Liu, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 406 days.

(21) Appl. No.: 17/187,303

(22) Filed: Feb. 26, 2021

(65) Prior Publication Data
US 2021/0183396 A1 Jun. 17, 2021

Related U.S. Application Data

(63) Continuation of application No. PCT/CN2019/101912, filed on Aug. 22, 2019.

(30) Foreign Application Priority Data

Aug. 29, 2018 (CN) .......................... 201810995203.7

(51) Int. Cl.
  *G10L 17/06* (2013.01)
  *G10L 17/02* (2013.01)
  (Continued)

(52) U.S. Cl.
  CPC .............. *G10L 17/06* (2013.01); *G10L 17/02* (2013.01); *G10L 17/04* (2013.01); *H04R 1/406* (2013.01); *H04R 3/005* (2013.01)

(58) Field of Classification Search
  CPC ......... G10L 17/06; G10L 17/02; G10L 17/04; G10L 17/00; G10L 21/0216;
  (Continued)

(56) References Cited

U.S. PATENT DOCUMENTS 8,219,394 B2 7/2012 Flaks et al.
8,754,925 B2 6/2014 Ng et al.
(Continued)

FOREIGN PATENT DOCUMENTS

CN 101673544 A 3/2010
CN 103957359 A 7/2014
(Continued)

OTHER PUBLICATIONS

Translation of First Chinese Office Action for corresponding Chinese Application No. 201810995203.7, dated Feb. 11, 2023, 28 pages.
(Continued)

*Primary Examiner* — Yogeshkumar Patel
(74) *Attorney, Agent, or Firm* — Lee & Hayes, P.C.

(57) ABSTRACT

A method including searching, on the basis of a voiceprint feature of a speaker, for an identifier of the speaker in a speaker registry, the voiceprint feature of the speaker being a parameter obtained according to a voice signal of the speaker captured by a microphone array; if position information corresponding to the identifier of the speaker in the speaker registry is different from position information of the speaker, updating the speaker registry, the position information of the speaker being a parameter obtained according to the voice signal of the speaker captured by the microphone array; and labeling the voice signal of the speaker with the identifier of the speaker, so as to track the speaker. The present disclosure enables voice tracking of multiple persons.

20 Claims, 8 Drawing Sheets

(51) Int. Cl.
*G10L 17/04* (2013.01)
*H04R 1/40* (2006.01)
*H04R 3/00* (2006.01)

(58) Field of Classification Search
CPC ...... G10L 21/0272; G10L 2021/02166; H04R 3/005; H04R 1/406
See application file for complete search history.

(56) References Cited

U.S. PATENT DOCUMENTS

| | | |
|---|---|---|
| 8,842,161 B2 | 9/2014 | Feng et al. |
| 8,842,177 B2 | 9/2014 | Beal et al. |
| 9,338,551 B2 | 5/2016 | Thyssen et al. |
| 9,392,221 B2 | 7/2016 | Feng et al. |
| 9,706,292 B2 | 7/2017 | Duraiswami et al. |
| 9,723,260 B2 | 8/2017 | Feng |
| 9,736,604 B2 | 8/2017 | Kim et al. |
| 9,774,970 B2 | 9/2017 | Benattar |
| 10,080,094 B2 | 9/2018 | Ugur et al. |
| 10,613,823 B2 | 4/2020 | Glaser et al. |
| 2010/0063817 A1* | 3/2010 | Toyama .................. G10L 17/04 704/243 |

FOREIGN PATENT DOCUMENTS

| | | | |
|---|---|---|---|
| CN | 103971690 A | 8/2014 | |
| CN | 105070304 A | 11/2015 | |
| CN | 105280183 A | 1/2016 | |
| CN | 105592268 A | 5/2016 | |
| CN | 106131785 A | 11/2016 | |
| CN | 106210511 A | 12/2016 | |
| CN | 106231047 A | 12/2016 | |
| CN | 108414981 A | 8/2018 | |
| EP | 1063634 A2 * | 12/2000 | ............. G10L 15/07 |
| KR | 20140074718 A | 6/2014 | |

OTHER PUBLICATIONS

Translation of International Search Report dated Nov. 29, 2019, from corresponding PCT Application No. PCT/CN2019/101912, 3 pages.

Translation of Written Opinion dated Nov. 29, 2019, from corresponding PCT Application No. PCT/CN2019/101912, 4 pages.

* cited by examiner

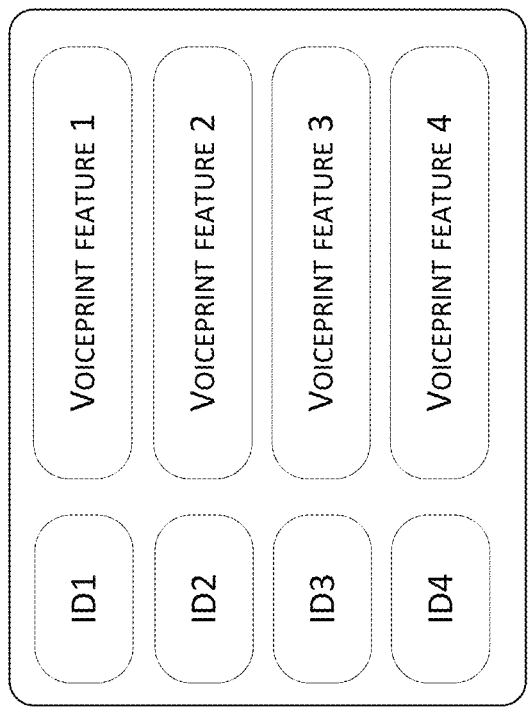
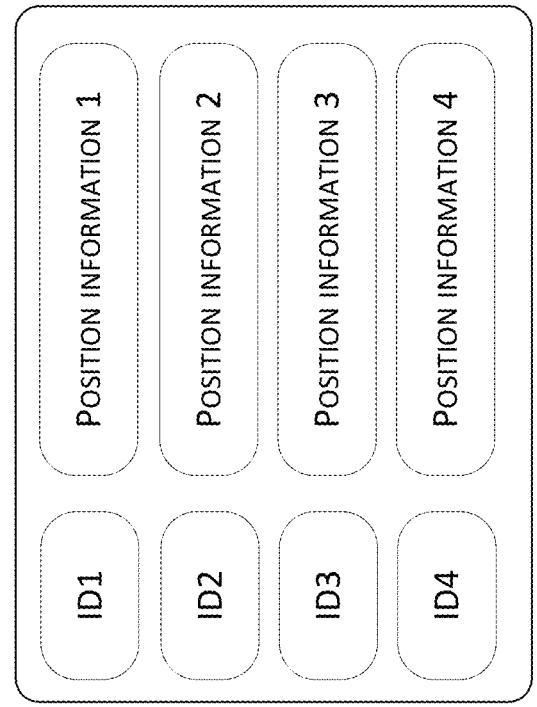
FIG. 4

SEARCH, ON BASIS OF VOICEPRINT FEATURE OF SPEAKER, FOR IDENTIFIER OF SPEAKER IN SPEAKER REGISTRY, VOICEPRINT FEATURE OF SPEAKER BEING PARAMETER OBTAINED ACCORDING TO VOICE SIGNAL OF SPEAKER CAPTURED BY MICROPHONE ARRAY
S602

UPDATE SPEAKER REGISTRY IF POSITION INFORMATION CORRESPONDING TO IDENTIFIER OF SPEAKER IN SPEAKER REGISTRY IS DIFFERENT FROM POSITION INFORMATION OF SPEAKER, POSITION INFORMATION OF SPEAKER BEING PARAMETER OBTAINED ACCORDING TO VOICE SIGNAL OF SPEAKER CAPTURED BY MICROPHONE ARRAY
S604

LABEL VOICE SIGNAL OF SPEAKER WITH IDENTIFIER OF SPEAKER, SO AS TO TRACK SPEAKER
S606

FIG. 6

VOICE PROCESSING

CROSS REFERENCE TO RELATED APPLICATIONS

This application claims priority to and is a continuation of PCT Patent Application No. PCT/CN2019/101912, filed on 22 Aug. 2019 and entitled "Method, Device, System and Apparatus for Voice Processing, and Medium," which claims priority to Chinese Patent Application No. 201810995203.7, filed on 29 Aug. 2018 and entitled "Method, Device, System and Apparatus for Voice Processing, and Medium," which are incorporated herein by reference in their entirety.

TECHNICAL FIELD

The present disclosure relates to the field of computer technology, and more particularly, to voice processing methods, apparatuses, systems, devices, and computer storage media.

BACKGROUND

Interference from background noise and other speakers is common interference during voice processing. The human auditory system is capable of distinguishing a voice signal of interest among others and tracking the voice signal of interest in a noisy environment.

Microphone array-based voice enhancement technologies are widely applied in in-vehicle communications, multimedia conferences, and robot control systems. Compared with one single microphone, a microphone array adds a spatial domain on the basis of time and frequency domains, and performs joint processing on signals coming from different spatial directions.

When a microphone array is used for voice separation, a spatial domain is divided and voice signals in corresponding spatial domains are captured, thereby achieving voice separation.

However, in scenarios such as meetings involving multiple speakers or interviews involving multiple individuals, it is desired to distinguish the voice of one person from the voice of others. As the position of each person may change, there exists a technical problem to track the voices of multiple persons.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

The embodiments of the present disclosure provide voice processing methods, apparatuses, systems, devices, and computer storage media, which are capable of tracking the voices of multiple persons.

A voice processing method, comprising:
searching, on the basis of a voiceprint feature of a speaker, for an identifier of the speaker in a speaker registry, the voiceprint feature of the speaker including a parameter obtained according to a voice signal of the speaker captured by a microphone array;

if position information corresponding to the identifier of the speaker in the speaker registry is different from position information of the speaker, updating the speaker registry the position information of the speaker, the position information of the speaker including a parameter obtained according to the voice signal of the speaker captured by the microphone array; and labeling the voice signal of the speaker with the identifier of the speaker, so as to track the speaker.

After the searching, on the basis of the voiceprint feature of the speaker, for the identifier of the speaker in the speaker registry, the method may further comprise:

if the position information corresponding to the identifier of the speaker in the speaker registry is identical to the position information of the speaker, labeling the voice signal of the speaker with the identifier of the speaker, so as to track the speaker.

The method may further comprise:

if the identifier of the speaker is not found in the speaker registry on the basis of the voiceprint feature of the speaker, adding the voiceprint feature of the speaker, the position information of the speaker, and the identifier of the speaker to the speaker registry, so as to track the speaker.

After the searching, on the basis of the voiceprint feature of the speaker, for the identifier of the speaker in the speaker registry, the method may further comprise:

if, on the basis of the voiceprint feature of the speaker, a registration time of the voiceprint feature found in the speaker registry occurs earlier than a preset time threshold, updating the speaker registry by using the voiceprint feature of the speaker.

The method may further comprise:

if whether the voiceprint feature of the speaker is found in the speaker registry is undecided, buffering the voice signal.

The method may further comprise:

if position information of one set of voice signals is different from position information of a previous set of voice signals, integrating, according to registration times of voiceprint features in the speaker registry, the voiceprint features in the speaker registry, the set of voice signals comprising one or more of the voice signals.

Before the searching, on the basis of the voiceprint feature of the speaker, for the identifier of the speaker in the speaker registry, the method may further comprise:

determining that a similarity between position information of one set of voice signals and position information of a previous set of voice signals is larger than or equal to a maximum similarity threshold, and the speaker registry is not completely filled with speaker voiceprint features stored therein.

Before the searching, on the basis of the voiceprint feature of the speaker, for the identifier of the speaker in the speaker registry, the method may further comprise:

determining that a similarity between position information of one set of voice signals and position information of a previous set of voice signals is larger than or equal to a maximum similarity threshold, and the speaker registry is completely filled with speaker voiceprint features stored therein.

The position information of the set of voice signals being different from the position information of the previous set of voice signals comprises:

a similarity between the position information of the set of voice signals and the position information of the previous set of voice signals being less than a maximum similarity threshold and greater than a minimum similarity threshold.

A voice processing system, wherein the voice processing system comprises: an acoustic sensor and a voice processing device, the acoustic sensor being coupled to the voice processing device, wherein the acoustic sensor is configured to capture a voice signal of a speaker, and the voice processing device is configured to:

receive the voice signal of the speaker, and acquire a voiceprint feature of the speaker and position information of the speaker, search for an identifier of the speaker in a speaker registry on the basis of the voiceprint feature of the speaker, update the speaker registry if position information corresponding to the identifier of the speaker in the speaker registry is different from the position information of the speaker, and label the voice signal of the speaker with the identifier of the speaker, so as to track the speaker.

The voice processing device is further configured to determine that the position information corresponding to the identifier of the speaker in the speaker registry is identical to the position information of the speaker, and label the voice signal of the speaker with the identifier of the speaker, so as to track the speaker.

The voice processing device is further configured to determine that the identifier of the speaker is not found in the speaker registry on the basis of the voiceprint feature of the speaker, and add the voiceprint feature of the speaker, the position information of the speaker, and the identifier of the speaker to the speaker registry, so as to track the speaker.

The voice processing device is further configured to determine that, on the basis of the voiceprint feature of the speaker, a registration time of the voiceprint feature found in the speaker registry occurs earlier than a preset time threshold, and update the speaker registry by using the voiceprint feature of the speaker.

The voice processing device is configured to determine whether the voiceprint feature of the speaker is found in the speaker registry is undecided, and buffer the voice signal.

The voice processing device is configured to determine that position information of one set of voice signals is different from position information of a previous set of voice signals, and integrate, according to registration times of voiceprint features in the speaker registry, the voiceprint features in the speaker registry, the set of voice signals comprising one or more of the voice signals.

The voice processing device is configured to determine that a similarity between position information of one set of voice signals and position information of a previous set of voice signals is larger than or equal to a maximum similarity threshold, and the speaker registry is not completely filled with speaker voiceprint features stored therein.

The voice processing device is configured to determine that a similarity between position information of one set of voice signals and position information of a previous set of voice signals is larger than or equal to a maximum similarity threshold, and the speaker registry is completely filled with speaker voiceprint features stored therein.

The voice processing device is configured to determine that a similarity between the position information of the set of voice signals and the position information of the previous set of voice signals being less than a maximum similarity threshold and greater than a minimum similarity threshold.

A voice processing apparatus, comprising:

a searching module, configured to search, on the basis of a voiceprint feature of a speaker, for an identifier of the speaker in a speaker registry, the voiceprint feature of the speaker being a parameter obtained according to a voice signal of the speaker captured by a microphone array;

an updating module, configured to update the speaker registry if position information corresponding to the identifier of the speaker in the speaker registry is different from position information of the speaker, the position information of the speaker being a parameter obtained according to the voice signal of the speaker captured by the microphone array; and a labeling module, configured to label the voice signal of the speaker with the identifier of the speaker, so as to track the speaker.

A voice processing apparatus, comprising:

a memory, configured to store a program; and a processor, configured to run the program stored in the memory to execute the voice processing method described above.

A computer-readable storage medium having computer program instructions stored thereon which, when executed by a processor, implement the voice processing method described above.

As shown from the above technical solutions, position information of a voice signal and a voiceprint feature of the voice signal are obtained according to the voice signal captured by a microphone array; a speaker registry stores a correspondence relationship among an identifier of a speaker, position information of the speaker, and voiceprint feature of the speaker, such that the identifier of the speaker is learned; and the voice signal is ultimately labeled with the identifier of the speaker. Thus, when a speaker's position changes, the voice signal is labeled with the identifier of the speaker, thereby tracking the voices of multiple persons.

BRIEF DESCRIPTION OF DRAWINGS

The present disclosure may be understood from the following description of the example embodiments of the present disclosure in conjunction with the accompanying drawings, wherein the same or similar reference numerals indicate the same or similar features.

FIG. 4 is a schematic diagram of a speaker position table and a speaker voiceprint feature table according to an embodiment of the present disclosure;

FIG. 6 is a schematic flowchart of a voice processing method according to an embodiment of the present disclosure;

DETAILED DESCRIPTION

The features and example embodiments of various aspects of the present disclosure will be described in detail below. In order to make the objectives, technical solutions, and advantages of the present disclosure clearer, the following describes the present disclosure in further detail with reference to the accompanying drawings and embodiments. It should be understood that the specific embodiments described herein are only configured to explain the present disclosure, and are not configured to limit the present disclosure. For those skilled in the art, the present disclosure may be implemented without some of these specific details. The following description of the embodiments is only to provide a better understanding of the present disclosure by using examples of the present disclosure.

It should be noted that relational terms herein, such as first and second, are only used to distinguish one entity or operation from another entity or operation, and do not necessarily require or imply any such actual relationship or order among these entities or operations. Moreover, the terms "include," "comprise," or any other variants thereof are intended to encompass non-exclusive inclusion, so that a process, method, product, or device that involves a series of elements comprises not only those elements, but also other elements not explicitly listed, or elements that are inherent to such a process, method, product, or device. Without more restrictions, an element defined by the phrase "comprising a . . . " does not exclude the presence of another same element in the process, method, product, or device that comprises the element.

In embodiments of the present disclosure, a microphone array may be used to perform signal sampling and signal processing on voice signals coming from different spatial directions in a noisy environment having multiple interference sources. Each acoustic sensor, such as a microphone, in the microphone array may be referred to as an array element. Each microphone array includes at least two array elements. Each array element may be regarded as an audio capturing channel. A multi-channel voice signal may be obtained by using a microphone array comprising multiple array elements.

In the embodiments of the present disclosure, sound source localization refers to determining, in actual application scenarios, a sound source direction or the spatial position of a sound source based on a voice signal captured by a microphone array, which then enables the detecting of the position of a voice sound source, and the determination of a spatial positional relationship between the microphone array and the sound source.

Figure 1:
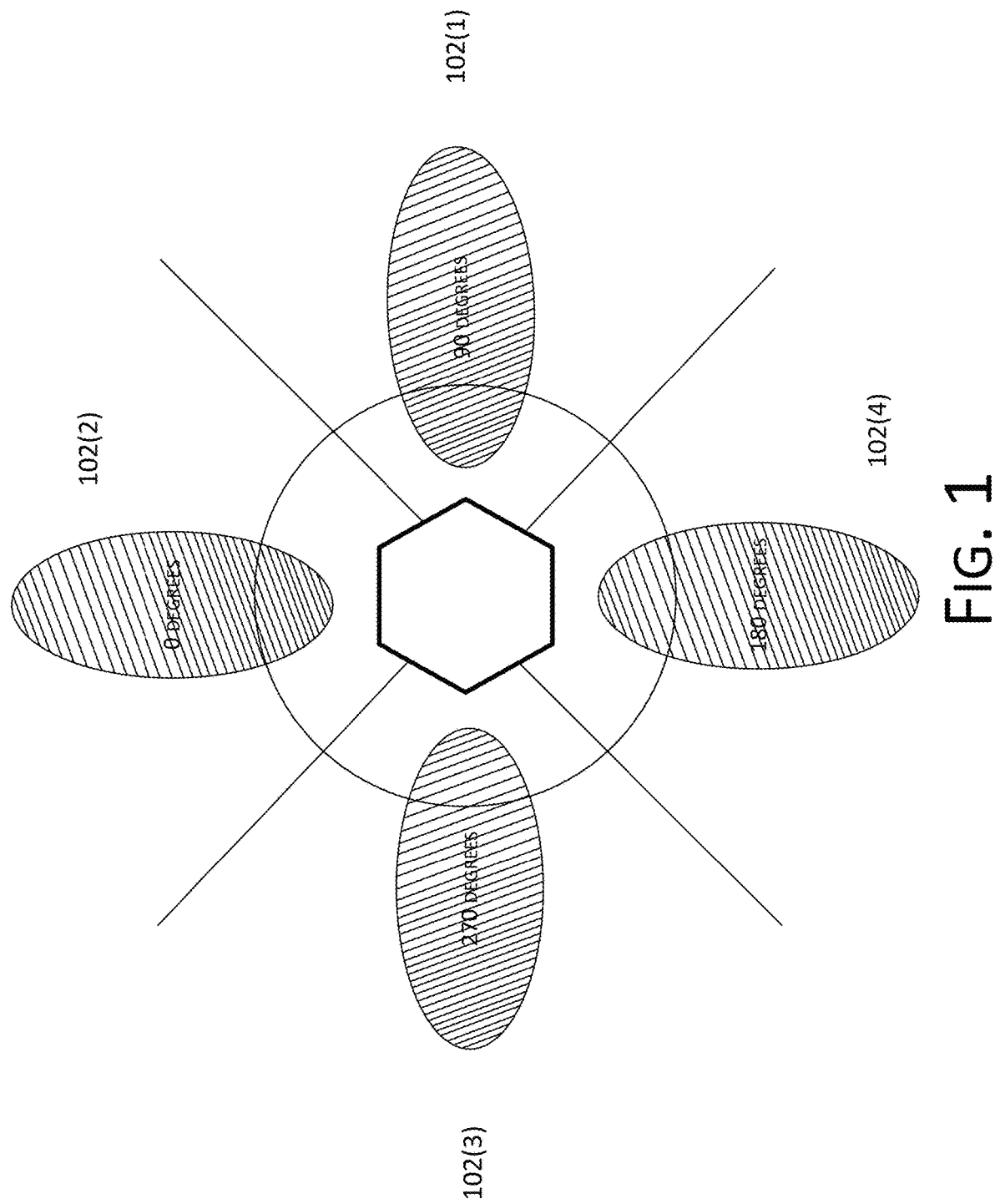
FIG. 1 is a schematic diagram of a scenario where a microphone array captures voice signals.

Referring to FIG. 1, which is a schematic diagram of a scenario where a microphone array captures voice signals. The microphone array in FIG. 1 has four array elements 102(1), 102(2), 102(3), 102(4), which capture voice signals in four directions. Each of the directions covers 90 degrees. As an example, the first array element captures voice signals in the range of −45 degrees to 45 degrees 102(1); the second array element captures voice signals in the range of 45 degrees to 135 degrees 102(2); the third array element captures voice signals in the range of 135 degrees to 225 degrees 102(3); and the fourth array element captures voice signals in the range of 225 degrees to 315 degrees 102(4).

In scenarios such as meetings involving multiple speakers or interviews involving multiple individuals, it is desired to distinguish voice of one person from voice of another person. A microphone array may be used to distinguish voice of one person from voice of another person. However, speakers' positions may change. This results in a problem of difficulties in tracking the voices of multiple persons.

Figure 2:
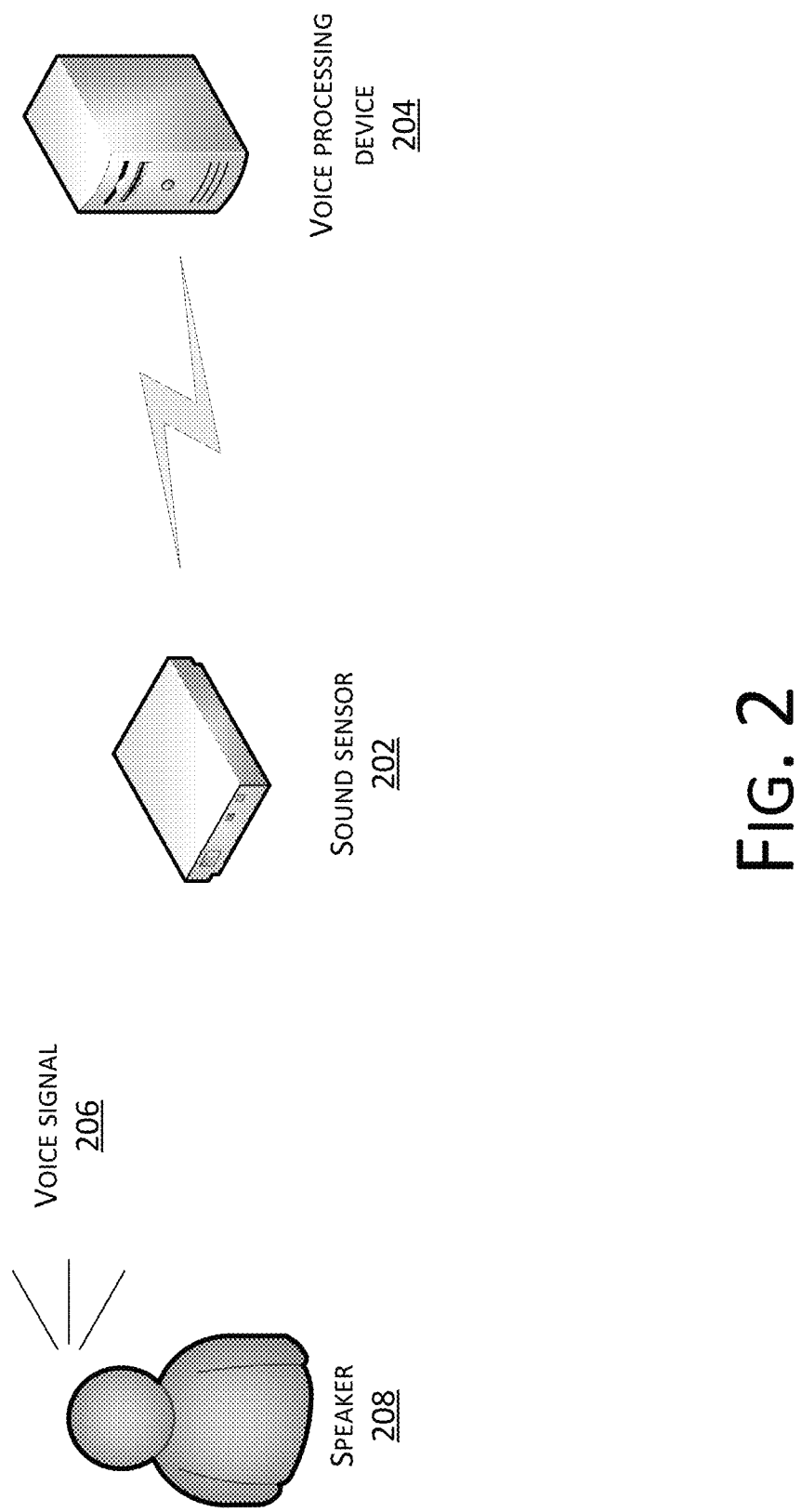
FIG. 2 is a schematic structural diagram of a voice processing system according to an embodiment of the present disclosure.

Please refer to FIG. 2. FIG. 2 is a schematic structural diagram of a voice processing system according to an embodiment of the present disclosure, which includes an acoustic sensor 202 and a voice processing device 204. The acoustic sensor 202 is coupled to the voice processing device 204.

The acoustic sensor 202 captures voice signals 206 of a speaker 208. Utilizing the technical solution in the embodiment of the present disclosure, the voice processing device 204 labels the voice signal of the speaker 208 with an identifier of the speaker 208, so as to track the speaker 208. As an example, the sound sensor 202 may be a microphone array.

Figure 3:
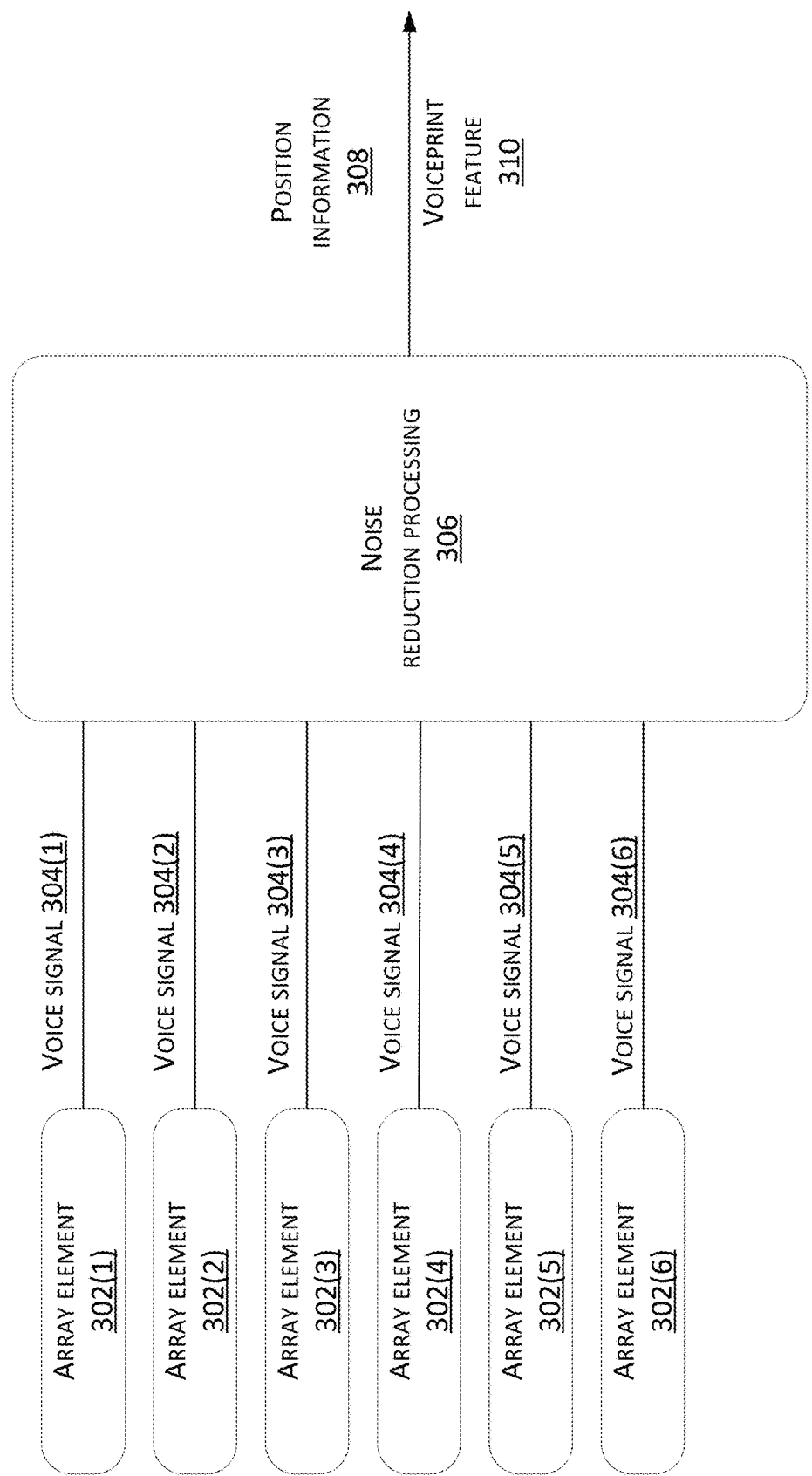
FIG. 3 is a schematic diagram of processing voice signals captured by a microphone array according to an embodiment of the present disclosure.

Please refer to FIG. 3, which is a schematic diagram of processing voice signals captured by a microphone array according to an embodiment of the present disclosure. In FIG. 3, the microphone array includes 6 array elements 302(1), 302(2), 302(3), 302(4), 302(5) 302(6), which respectively capture 6 voice signals 304(1), 304(2), 304(3), 304(4), 304(5), 304(6). A beamforming technique is utilized to process the 6 voice signals.

For example, noise reduction processing 306 is performed on the 6 voice signals respectively, and position information 308 and voiceprint features 310 of speakers are determined. As an example, the voice signals 304 of the speakers are processed to obtain position information 308 of the voice signals. The position information 308 includes directions of arrival (DOA). The DOA obtains distance information and orientation information of a speaker by processing a received echo signal.

In an embodiment of the present disclosure, the length of a voice signal of a speaker may be 500 milliseconds (ms). Considering that 500 ms is a relatively short duration, it is assumed that a voice signal having a 500 ms length entails only one sound source. In other words, the 500-ms voice signal indicates voice from merely one speaker. Each 500-ms voice signal includes a DOA.

In an embodiment of the present disclosure, a speaker registry is provided. The speaker registry includes a correspondence relationship among an identifier of a speaker, position information of the speaker, and a voiceprint feature of the speaker.

The identifier of the speaker is a marker used to distinguish said speaker from others. As an example, the identifier of the speaker may be a character and the like.

The position information of the speaker is used to identify the position of the speaker. As an example, the position information of the speaker includes a DOA.

The voiceprint feature of the speaker is a voiceprint feature corresponding to the speaker. A voiceprint is a sound wave spectrum carrying verbal information displayed by electroacoustic instruments. Since the voiceprint feature of one speaker is different that of another speaker, different speakers may then be distinguished using voiceprint features.

As an example, a voiceprint feature may include features such as a frequency spectrum, cepstrum, formant, pitch, reflection coefficient, etc.; the voiceprint feature may also include a lexical feature of a language, such as word relevance in a context, a phoneme relevance in a context, etc.; the voiceprint feature may also include a prosodic feature; in addition, the voiceprint feature may also include features such as language types, dialects, accents, etc.

The speaker registry includes the correspondence relationship among the identifier of the speaker, the position information of the speaker, and the voiceprint feature of the speaker. As an example, the speaker registry includes an identifier of speaker A, position information of the speaker A, and a voiceprint feature of the speaker A.

In an embodiment of the present disclosure, the speaker registry may be updated using a speaker position table and a speaker voiceprint feature table. In other words, the speaker registry includes the speaker position table and the speaker voiceprint feature table. The speaker position table is used to record IDs of speakers and position information of the speakers. The speaker voiceprint feature table is used to record the IDs of the speakers and the voiceprint features of the speakers.

Please refer to FIG. 4, which is a schematic diagram of a speaker position table 402 and a speaker voiceprint feature table 404 according to an embodiment of the present disclosure. The left diagram in FIG. 4 is the speaker position table 402, whereas the right diagram in FIG. 4 is the speaker voiceprint feature table 404. The identifiers of the speakers may be the IDs of the speakers.

The correspondence relationship between the IDs of the speakers and the position information of the speakers is recorded in the speaker position table 402. The correspondence relationship between the IDs of the speakers and the voiceprint features of the speakers is recorded in the speaker voiceprint feature table 404.

The voiceprint features of speakers are a parameter that only changes marginally over time. Changes in the speaker voiceprint feature table thus rarely happen except when a new speaker is added.

The positions of the speakers are a parameter that changes over time. Changes in the speaker position table thus do occur to a greater extent as time goes by.

Compared with the speaker voiceprint feature table, the speaker position table changes more significantly over time, and the speaker registry is thus divided into the speaker voiceprint feature table and the speaker position table. In this way, when the speaker registry is to be updated, only the speaker position table needs to be updated, and no update is needed for the speaker voiceprint feature table.

Position information of a voice signal and a voiceprint feature of the voice signal are obtained according to the voice signal captured by a microphone array.

Based on the position information of the voice signal and the voiceprint features of the voice signal, there are three types of scenarios.

The first scenario is an undetermined state.

When whether the voiceprint feature of the voice signal is found in the speaker registry is undetermined, this indicates that it is difficult to determine whether the voiceprint feature of the voice signal is present in the speaker registry. There are many reasons as to why the determination is difficult. For example, the reasons might be that the length of the voice signal is too short, the voice signal contains excessive noise, or the like.

In the undetermined state, the voice signal may be buffered. As a result, another search may be performed in the speaker registry for the buffered voice signal.

The second scenario is that the speaker is not registered in the speaker registry. That is, the speaker is an unregistered speaker.

If a voiceprint feature of a voice signal is not found in the speaker registry, it indicates that the speaker is a new user. Since a storage space is required to store the speaker registry, there is a limit in terms of voiceprint features of speakers that can be stored in the speaker registry.

If the speaker is a new user, and the speaker registry is not completely filled with the speaker voiceprint features stored therein, the voiceprint feature of the new user, position information of the new user, and an identifier of the new user may be added to the speaker registry. The identifier of the new user may be a marker that distinguishes the new user from other existing users.

The following describes a detailed process of searching for the voiceprint feature of the voice signal in the speaker registry.

For example, an acoustic feature of the voice signal may be compared against a speaker acoustic features in the speaker registry in a one-by-one fashion. If a similarity between the acoustic feature of the voice signal and a speaker's acoustic feature in the speaker registry is greater than a similarity threshold, it is determined that the voiceprint feature of the voice signal is found in the speaker registry; otherwise, if the similarity between the acoustic feature of the voice signal and the speaker's acoustic feature in the speaker registry is less than or equal to the similarity threshold, it is determined that the voiceprint feature of the voice signal is not found in the speaker registry.

In an embodiment of the present disclosure, a pre-trained voiceprint recognition model may be used to determine the similarity between the acoustic feature of the voice signal and the speaker's acoustic feature in the speaker registry. The voiceprint recognition model may take the acoustic feature of the voice signal and the speaker's acoustic feature in the speaker registry as input. After calculation is performed using parameters in the voiceprint recognition model, the similarity between the acoustic feature of the voice signal and the speaker's acoustic feature in the speaker registry may be obtained.

It should be noted that when the voiceprint recognition model is trained, the parameters in the voiceprint recognition model may be adjusted according to a similarity of an acoustic feature, such that the voiceprint recognition model can more accurately determine a similarity of an acoustic feature based on a voiceprint feature.

The third scenario is that the speaker has registered in the speaker registry, i.e., the speaker being a registered speaker.

When the voiceprint feature of the voice signal is found in the speaker registry, it indicates that the speaker is an existing user. In the speaker registry, a voiceprint feature of an existing user refers to a voiceprint feature registered at the time when said user was registered or when the speaker registry was updated. Therefore, each voiceprint feature in the speaker registry corresponds to a registration time.

As an example, for user A, the time that user A registered the voiceprint feature in the speaker registry is 09:30:02 on January 1st. If user A has not updated the voiceprint feature in the speaker registry before the current time, it can be regarded that the registration time of the voiceprint feature of user A is 09:30:02 on January 1st.

As another example, for user A, the time that user A registered the voiceprint feature in the speaker registry is 09:30:02 on January 1st. User A updated the voiceprint feature in the speaker registry at 9:30:45 on January 1st. Then, it can be regarded that the registration time of the voiceprint feature of user A is 09:30:45 on January 1st.

In the speaker registry, if a registration time of the voiceprint feature of the existing user in the speaker registry occurs earlier than a preset time threshold, it indicates that the voiceprint feature of the voice signal may be used for updating the voiceprint feature of the existing user in the speaker registry. As a result, the real-time nature of a voiceprint feature of an existing user may be guaranteed.

In the speaker registry, if the registration time of a voiceprint feature of an existing user in the speaker registry occurs later than the preset time threshold, it indicates that the voiceprint feature of the existing user in the speaker registry does not need to be updated.

The position information of the voice signal obtained from the voice signal captured by the microphone array is used to decide whether a speaker has changed his/her position.

In an embodiment of the present disclosure, if position information corresponding to the identifier of the speaker in the speaker registry is different from the position information of the voice signal, it indicates that the speaker has moved from a position corresponding to the position information that corresponds to the identifier of the speaker to a position corresponding to the position information of the voice signal. In this case, an update of the position information in the speaker registry is required. For example, the position information corresponding to the identifier of the speaker may be updated using the position information of the voice signal. Afterwards, the voice signal is labeled with the identifier of the speaker, thereby achieving tracking of the speaker.

In an embodiment of the present disclosure, if the position information corresponding to the identifier of the speaker in the speaker registry is identical to the position information of the voice signal, it indicates that the speaker has not moved, which indicates that updating the position information in the speaker registry is not required. Then, the voice signal is labeled with the identifier of the speaker, thereby achieving tracking of the speaker.

In an embodiment of the present disclosure, whether the speaker registry needs to be updated may be determined according to the position information of the voice signal and the voiceprint feature of the voice signal. If the speaker registry does not need to be updated, the identifier of the speaker may then be determined in the speaker registry based on the position information of the voice signal and the voiceprint feature of the voice signal; if the speaker registry needs to be updated, the identifier of the speaker may then be determined in the updated speaker registry based on the position information of the voice signal and the voiceprint feature of the voice signal. Finally, the voice signal is labeled with the identifier of the speaker to achieve tracking of the speaker.

A clear-cut decision cannot be made, given that the reliability of the voiceprint itself is not particularly high. If the speaker registry is updated with errors, the erroneous update would result in relatively poor accuracy in tracking speakers.

As each voice signal has a relatively short duration when being captured, determination of consistency with voiceprints in the speaker registry might not be available for all of the voice signals. On the other hand, if a reliable result is required, the duration of each voice signal needs to be increased, which results in poor real-time performance of voice processing.

In an embodiment of the present disclosure, in order to enhance accuracy in speaker tracking and real-time performance of voice processing, a state machine is used to process a voice signal captured by a microphone array. The state machine, which consists of state registers and a combinational logic circuit, is capable of performing state transition in accordance with preset states according to a control signal, and is a control center that coordinates related signal actions and completes specific operations. It can be understood that the technical solutions in the embodiments of the present disclosure may be implemented via controlling using a state machine.

In an embodiment of the present disclosure, the state machine may include the following five states: a fuzzy state, a determined state, a critical state, a stable state, and a delay state.

The fuzzy state: if whether a voiceprint feature of a voice signal is identical to a voiceprint in a speaker registry cannot be decided, the state machine enters the fuzzy state.

The determined state: if whether the voiceprint feature of the voice signal is identical to a voiceprint in the speaker registry can be decided, and the speaker registry is not completely filled with speaker voiceprint features stored therein, the state machine enters the determined state.

The critical state: if the position information of the voice signal is different from position information of a previous voice signal, the state machine enters the critical state.

The stable state: whether the voiceprint feature of the voice signal is identical to a voiceprint in the speaker registry can be decided, and the speaker registry is completely filled with speaker voiceprint features stored therein, then the state machine enters the stable state.

The delay state: if a similarity between the position information of the voice signal and the position information of the previous voice signal is less than a maximum similarity threshold and greater than a minimum similarity threshold, then the state machine enters the delay state.

Transitions among the fuzzy state, the determined state, the critical state, the stable state, and the delay state are allowed. It should be noted that there is a limitation in terms of the number of speakers' voiceprint features stored in the speaker registry. In other words, the speaker registry may either be completely filled with speaker voiceprint features stored therein, or not completely filled with speaker voiceprint features stored therein.

Adding a speaker to the speaker registry requires adding a voiceprint feature of the speaker. If the speaker registry is completely filled with speakers' voiceprint features stored therein, a speaker cannot be added, but the voiceprint and/or position information of a speaker may be updated.

In the situation where the speaker registry is not completely filled with speakers' voiceprint features stored therein, the voiceprint and/or position information of a speaker may be updated, and the voiceprint feature of a speaker may be added.

Figure 5:
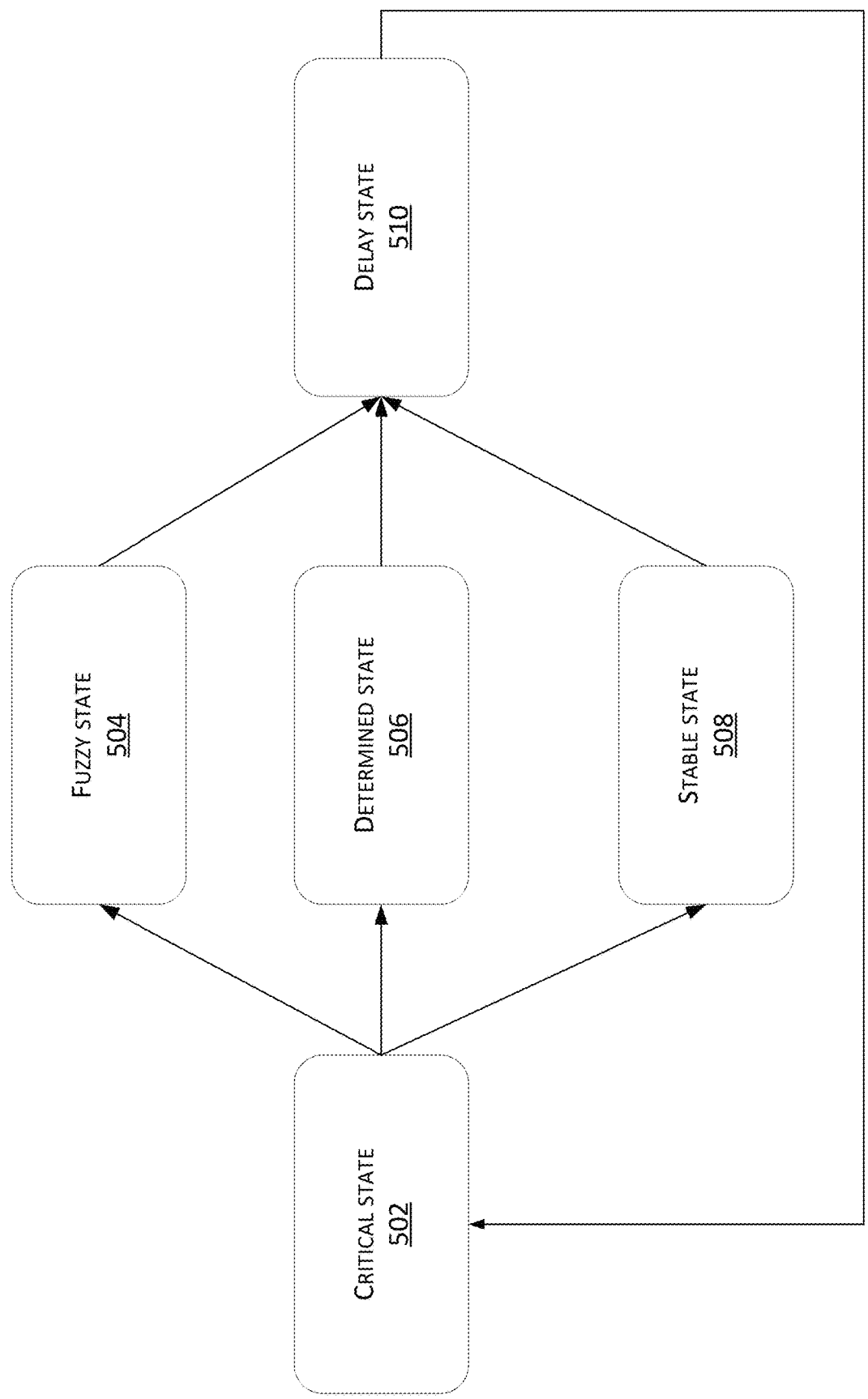
FIG. 5 is a schematic diagram of a relationship among five states according to an embodiment of the present disclosure.

Please refer to FIG. 5, which is a schematic diagram of the relationship among the five states in an embodiment of the present disclosure. The following takes a voice block as an example to illustrate the relationship among the five states in detail.

If a direction of voice is switched to another direction, the state machine enters the critical state 502. If a certain condition is met, the critical state 502 is switched to the fuzzy state 504, determined state 506, or stable state 508 respectively. When in the fuzzy state 504, determined state 506, or stable state 508, the state machine may also be switched to the delay state 510. The delay state 510 may further be switched to the critical state 502.

In an embodiment of the present disclosure, a duration of one voice block is 500 ms, and 4 voice blocks may serve as a set of voice signals. In other words, the duration of a set of voice data is 2 seconds (s). Position information of the voice blocks may be a DOA. Each of the voice blocks may be labeled with the DOA thereof. In this way, the set of voice data has 4 DOAs therein.

If the position information of the set of voice data is different from position information of a previous set of voice data, it indicates that the direction of voice is switched to a different direction, and the state machine is in the critical state at this time.

As an example, a set of voice data includes four voice blocks, and each voice block is labeled with a DOA. If the 4 DOAs of a set of voice data are not completely identical to the 4 DOAs of a previous set of voice data, it indicates that the direction of voice is switched to a different direction. A maximum similarity threshold is set as 75%, which means that 3 out of the 4 DOAs of the set of voice data are identical to 3 out of the 4 DOAs of the previous set of voice data. A minimum similarity threshold is set as 25%, which means that 1 out of the 4 DOAs of the set of voice data is identical to 1 out of the 4 DOAs of the previous set of voice data.

In the critical state 502, the voice data is buffered first. Then, according to registration times of voiceprint features of speakers, the voiceprint features in the speaker registry are integrated.

As an example, integrating the voiceprint features in the speaker registry includes deleting voiceprints having a shorter registration duration, so as to minimize the impact of newly added voiceprint features on the speaker registry. For example, voiceprint features having a registration duration less than 4 s are deleted from the speaker registry.

As another example, integrating the voiceprint features in the speaker registry includes merging duplicate voiceprint features. For example, voiceprint features having a registration duration longer than 15 s are compared against one another to obtain those having a high similarity in acoustic features. Two voiceprint features having high similarity in acoustic features indicate that these two are more likely to be the same voiceprint feature. The two voiceprint features having high similarity in acoustic features are then merged.

If the speaker registry is not completely filled with speaker voiceprint features stored therein, and a similarity between the DOAs of the voice data and the DOAs of the previous voice data is greater than or equal to the maximum similarity threshold, the state machine enters the fuzzy state. Herein, the similarity may be equal to the proportion of identical voice blocks.

If the state machine is in the fuzzy state 504, multiple sets of voice data are buffered. As an example, at most 7 sets of voice data may be buffered. Then, a matching operation against speakers' voiceprint features stored in the speaker registry is performed based on the buffered voice data. More buffered voice data yields higher accuracy of the matching result.

In the fuzzy state 504, if the similarity between the DOAs of the captured voice data and the DOAs of the previous voice data is less than the maximum similarity threshold and greater than the minimum similarity threshold, it indicates that the similarity of the two pieces of voice data decreases. The state of the state machine is then switched to the delay state 510.

If a confirmed matching result is obtained from the matching operation against speakers' voiceprint features stored in the speaker registry based on the buffered voice data, the state machine enters the determined state.

In the determined state 506, clearing the buffer is required to ensure the real-time nature of voice processing. If the similarity between the DOAs of the captured voice data and the DOAs of the previous voice data is less than the maximum similarity threshold and greater than the minimum similarity threshold, it indicates that the similarity of the two pieces of voice data decreases. The state of the state machine is then switched to the delay state.

If the speaker registry is completely filled with speaker voiceprint features stored therein, and a similarity between the DOAs of the voice data and the DOAs of the previous voice data is greater than or equal to the maximum similarity threshold, the state machine enters the stable state.

In the stable state 508, the voice data may be buffered. A matching operation against speakers' voiceprint features stored in the speaker registry is performed based on the buffered voice data to obtain a confirmed matching result.

Adding a speaker to the speaker registry requires adding a voiceprint feature of the speaker. If the speaker registry is completely filled with speakers' voiceprint features stored therein, the voiceprint feature of a speaker cannot be added, but the voiceprint and/or position information of a speaker may be updated.

Therefore, in the stable state 508, the voiceprint feature of a speaker cannot be added to the speaker registry. However, the voiceprint and/or position information of a speaker may be updated.

If the similarity between the DOAs of the captured voice data and the DOAs of the previous voice data is less than the maximum similarity threshold and greater than the minimum similarity threshold, it indicates that the similarity of the two pieces of voice data decreases. The state of the state machine is then switched to the delay state.

In the cases of the fuzzy state 504, the determined state 506, and the stable state 508, if the similarity of the voice data is less than the maximum similarity threshold and greater than the minimum similarity threshold, the state of the state machine may be switched to the delay state 510.

Afterwards, if the delay state 510 is maintained for multiple iterations, the delay state 510 is switched to the critical state 502. As an example, if the condition of a similarity of adjacent conjunctions in the voice data being less than the maximum similarity threshold and greater than the minimum similarity threshold is met twice in a row, the delay state 510 is switched to the critical state 502.

In the embodiment of the present disclosure, the state machine may be used to control the update of the speaker registry, which in turn improves the accuracy and real-time performance of speaker tracking.

In light of the foregoing description, the technical solutions of the embodiments of the present disclosure may be summarized as follows.

Please refer to FIG. 6, which is a schematic flowchart of a voice processing method in an embodiment of the present disclosure. The method includes the following.

S602. Search, on the basis of a voiceprint feature of a speaker, for an identifier of the speaker in a speaker registry, the voiceprint feature of the speaker being a parameter obtained according to a voice signal of the speaker captured by a microphone array.

The microphone array captures a voice signal, and may obtain position information of the voice signal. The voiceprint feature may be extracted based on the captured voice signal.

The speaker registry stores a correspondence relationship among identifiers of speakers, position information of the speakers, and voiceprint features of the speakers.

The voiceprint feature of the voice signal is compared against speakers' voiceprint features in the speaker registry in a one-by-one fashion.

If a similarity between the voiceprint feature of the voice signal and a speaker's voiceprint feature in the speaker registry is greater than a similarity threshold, it can be considered that the voiceprint feature of the voice signal is present in the speaker registry.

If the similarity between the voiceprint feature of the voice signal and a speaker's voiceprint feature in the speaker registry is less than or equal to a similarity threshold, it can be considered that the voiceprint feature of the voice signal is not present in the speaker registry.

S604. Update the speaker registry if position information corresponding to the identifier of the speaker in the speaker registry is different from position information of the speaker, the position information of the speaker being a parameter obtained according to the voice signal of the speaker captured by the microphone array.

Whether the position information of the speaker is identical to position information corresponding to the voiceprint feature of the voice signal in the speaker registry is decided. If the position information is identical, it indicates that the position of the speaker has not changed; and otherwise, it indicates that the position of the speaker has changed.

In the case where the position of the speaker has changed, the speaker registry needs to be updated.

S606. Label the voice signal of the speaker with the identifier of the speaker, so as to track the speaker.

The voice signal of the speaker is labeled with the identifier of the speaker, so as to achieve speaker tracking.

In the foregoing embodiments, the identifier of the speaker can be found in the speaker registry according to the voiceprint feature of the speaker. Then, if the position information corresponding to the identifier of the speaker is determined to be different from the position information of the speaker, it indicates that the speaker has moved, and the speaker registry is updated. Finally, the voice signal of the speaker is labeled with the identifier of the speaker, so as to track the speaker. Thus, when the position of the speaker changes, the voice signal may be labeled with the identifier of the speaker. Even if a speaking direction changes, voice tracking of multiple persons may still be achieved since each voice signal is labeled with the identifier of the speaker.

In an embodiment of the present disclosure, when a voiceprint feature in the speaker registry is identical to the voiceprint feature of the voice signal, and the position information of the voice signal in the speaker registry is identical to the position information of the voice signal, it indicates that the position of the same speaker has not changed. Then, in the above case, the speaker registry does not need to be updated. The voice signal of the speaker is labeled with the identifier of the speaker, so as to track the speaker.

It should be noted that when the speaker registry is searched, first the voiceprint feature of the voice signal needs to be found in the speaker registry, and an identifier of a speaker corresponding to the voiceprint feature of the voice signal is determined. Then, if the position information corresponding to said identifier of the speaker in the speaker registry is identical to the position information of the voice signal, said identifier of the speaker is used as an identifier of the speaker corresponding to the position information of the voice signal.

In other words, the identifier of the speaker can be directly learned in accordance with the correspondence relationship in the speaker registry instead of solely relying on the voiceprint feature of the voice signal or the position information of the voice signal. This is to address uncertainty in whether a speaker has moved or not. Then, whether the voiceprint feature of the voice signal is present in the speaker registry needs to be determined first. Next, the identifier of the speaker is determined according to the voiceprint feature of the voice signal. Finally, a decision of whether the speaker has moved is further made. It can be seen that the sequence of the above decision process improves the accuracy of deciding whether the speaker has moved.

In an embodiment of the present disclosure, if a voiceprint feature of a voice signal is not found in the speaker registry, it indicates that a speaker is an unregistered user, i.e., a new user. Then, the new user needs to be registered in the speaker registry.

For example, the voiceprint feature of the voice signal, the position information of the voice signal, and the identifier of the speaker corresponding to the voiceprint feature of the voice signal are added to the speaker registry. The identifier of the speaker may be an identifier that distinguishes said speaker from other users.

For a new user, the identifier of the speaker newly added to the speaker registry is used as the identifier of the speaker corresponding to the position information.

In this way, speaker tracking is also enabled for the new speaker by labeling the voice signal with the identifier of the speaker.

In an embodiment of the present disclosure, if a voiceprint feature of a voice signal is found in the speaker registry, it indicates that a speaker is a registered user, i.e., an existing user.

The voiceprint feature of the voice signal in the speaker registry is a voiceprint feature of the existing user from earlier registration in the speaker registry or when the speaker registry is updated. If a registration time of the voiceprint feature found in the speaker registry occurs earlier than a preset time threshold, it indicates that the voiceprint feature in the speaker registry is not a recent voiceprint feature of the speaker. To improve voiceprint recognition, since the voiceprint feature of the voice signal is the most recent voiceprint feature of the user, the voiceprint feature of the voice signal may be used for updating the voiceprint feature of the user in the speaker registry.

In an embodiment of the present disclosure, whether a voiceprint feature of a voice signal is found in the speaker registry cannot be determined. For the above-mentioned case in which determination is unavailable, the voice signal may be buffered. After multiple voice signals are buffered, the length of the multiple voice signals is much greater than the length of one voice signal. Based on these multiple voice signals, whether the voiceprint feature of the voice signals is found in the speaker registry is decided again. In this way, the accuracy of recognizing voiceprint features can be enhanced.

In an embodiment of the present disclosure, many voiceprint features are stored in the speaker registry. Due to the limitation of storage space, there is a limitation in terms of the number of voiceprint features that can be stored in the speaker registry. Therefore, the voiceprint features in the speaker registry need to be integrated.

If changes occur in a set of voice signals, the voiceprint features in the speaker registry may be integrated. It should be noted that a set of voice signals includes one or more voice signals. Thus, position information of two voice signals are compared, and a similarity between the position information of the two voice signals may be measured using the similarity from the comparison. As an example, a set of voice signals includes four voice signals. If 3 voice signals in each of two segments of voice signals have identical position information, a similarity between the two segments of the voice signals is 75%.

As an example, if position information of a current set of voice signals is different from position information of a previous set of voice signals, voiceprint features in the speaker registry may be integrated according to registration times of the voiceprint features in the speaker registry.

In an embodiment of the present disclosure, if a direction of a set of voice signals does not change much, which means that a similarity between position information of the current set of voice signals and position information of the previous set of voice signals is greater than or equal to a maximum similarity threshold, and the condition that the speaker registry is not completely filled with speaker voiceprint features stored therein is met at the same time, this indicates that registration for a new user may be conducted and/or that an existing user may have moved.

In an embodiment of the present disclosure, if a direction of a set of voice signals does not change much, which means that a similarity between position information of the current set of voice signals and position information of the previous set of voice signals is greater than or equal to a maximum similarity threshold, and the condition that the speaker registry is completely filled with speaker voiceprint features stored therein is met at the same time, this indicates that registration for a new user may not be conducted and/or that an existing user may have moved.

In an embodiment of the present disclosure, if the direction of the set of voice signals changes greatly, which means that a similarity between the position information of the current set of voice signals and the position information of the previous set of voice signals is less than the maximum similarity threshold and greater than a minimum similarity threshold, and a cause for the large change in the direction of the voice signals may be a voice pause or false detection, then the voiceprint features in the speaker registry may be integrated.

Figure 7:
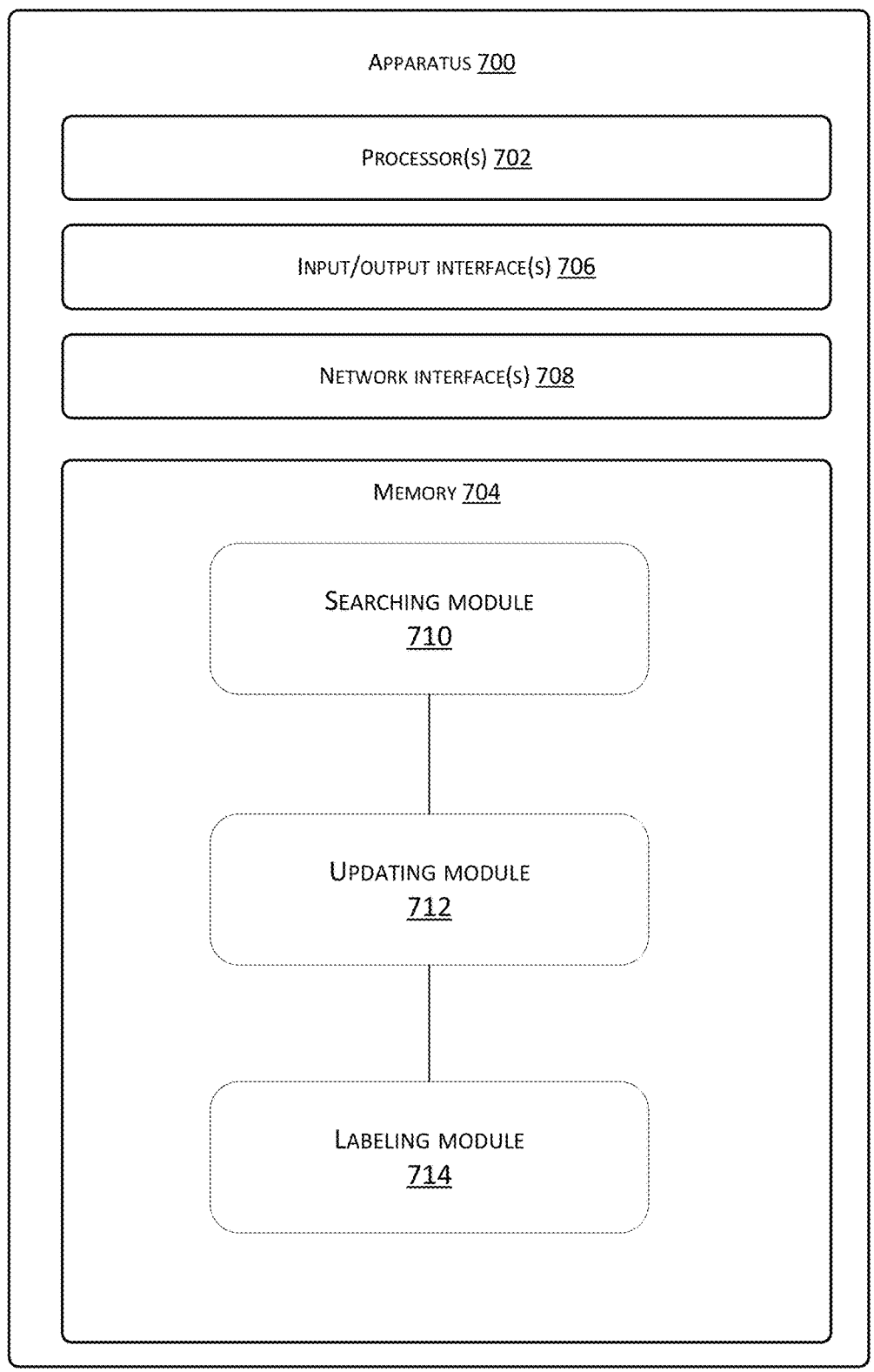
FIG. 7 is a schematic structural diagram of a voice processing apparatus according to an embodiment of the present disclosure.

Please refer to FIG. 7, which is a schematic structural diagram of a voice processing apparatus 700 in an embodiment of the present disclosure. The apparatus 700 performs acts corresponding to the voice processing method described above.

As shown in FIG. 7, the apparatus 700 includes one or more processor(s) 702 or data processing unit(s) and memory 704. The apparatus 700 may further include one or more input/output interface(s) 706 and one or more network interface(s) 708.

The memory 704 is an example of computer readable media. The computer readable media include non-volatile and volatile media as well as movable and non-movable media, and can implement information storage by means of any method or technology. Information may be a computer readable instruction, a data structure, and a module of a program or other data. An example of the storage media of a computer includes, but is not limited to, a phase-change memory (PRAM), a static random access memory (SRAM), a dynamic random access memory (DRAM), other types of RAMs, a ROM, an electrically erasable programmable read-only memory (EEPROM), a flash memory or other memory technologies, a compact disc read-only memory (CD-ROM), a digital versatile disc (DVD) or other optical storages, a cassette tape, a magnetic tape/magnetic disk storage or other magnetic storage devices, or any other non-transmission media, and can be used to store information accessible by the computing device. According to the definition in this text, the computer readable media does not include transitory computer readable media (transitory media) such as a modulated data signal and carrier.

The memory 704 may store therein a plurality of modules or units including:

a searching module 710, configured to search, on the basis of a voiceprint feature of a speaker, for an identifier of the speaker in a speaker registry, the voiceprint feature of the speaker being a parameter obtained according to a voice signal of the speaker captured by a microphone array;

an updating module 712, configured to update the speaker registry if position information corresponding to the identifier of the speaker in the speaker registry is different from position information of the speaker, the position information of the speaker being a parameter obtained according to the voice signal of the speaker captured by the microphone array; and a labeling module 714, configured to label the voice signal of the speaker with the identifier of the speaker, so as to track the speaker.

In an embodiment of the present disclosure, the updating module 712 is further configured to determine that the position information corresponding to the identifier of the speaker in the speaker registry is identical to the position information of the speaker.

In an embodiment of the present disclosure, the searching module 710 is further configured to determine that the identifier of the speaker is not found in the speaker registry on the basis of the voiceprint feature of the speaker.

The updating module 712 is further configured to add the voiceprint feature of the speaker, the position information of the speaker, and the identifier of the speaker to the speaker registry, so as to track the speaker.

In an embodiment of the present disclosure, the updating module 712 is further configured to determine that, on the basis of the voiceprint feature of the speaker, a registration time of the voiceprint feature found in the speaker registry occurs earlier than a preset time threshold, and update the speaker registry by using the voiceprint feature of the speaker.

In an embodiment of the present disclosure, the searching module 710 is further configured to buffer the voice signal if whether the voiceprint feature of the speaker is found in the speaker registry is undecided.

In an embodiment of the present disclosure, the updating module 712 is further configured to determine that position information of one set of voice signals is different from position information of a previous set of voice signals, and integrate, according to registration times of voiceprint features in the speaker registry, the voiceprint features in the speaker registry, the set of voice signals comprising one or more of the voice signals.

In an embodiment of the present disclosure, the updating module 712 is further configured to determine that a similarity between position information of one set of voice signals and position information of a previous set of voice signals is larger than or equal to a maximum similarity threshold, and the speaker registry is not completely filled with speaker voiceprint features stored therein.

In an embodiment of the present disclosure, the updating module 712 is further configured to determine that a similarity between position information of one set of voice signals and position information of a previous set of voice signals is larger than or equal to a maximum similarity threshold, and the speaker registry is completely filled with speaker voiceprint features stored therein.

In an embodiment of the present disclosure, the updating module 712 is configured to determine that a similarity between the position information of the set of voice signals and the position information of the previous set of voice signals being less than a maximum similarity threshold and greater than a minimum similarity threshold.

Figure 8:
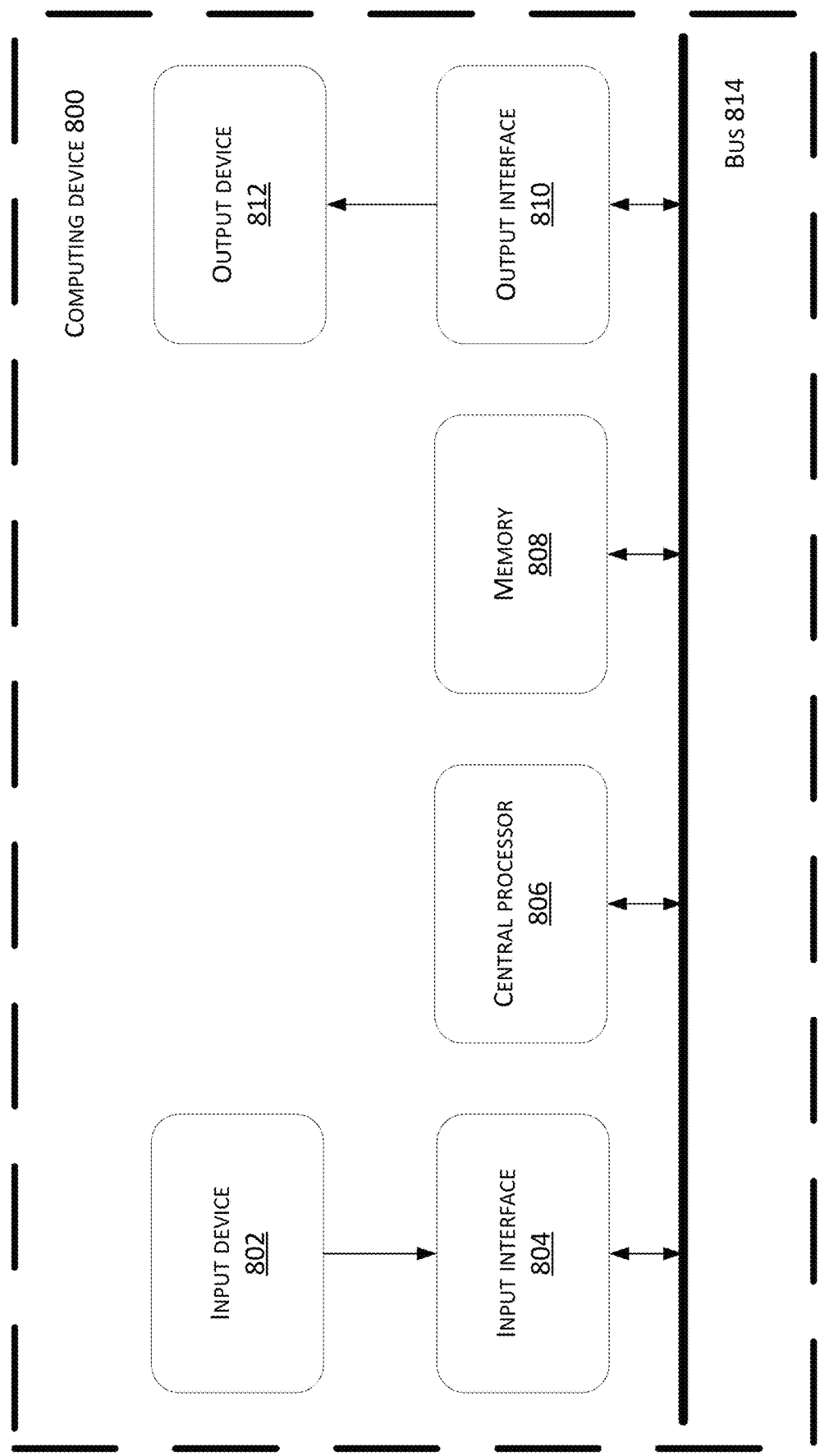
FIG. 8 is a structural diagram of an example hardware architecture of a computing device for the voice processing method, apparatus, and system according to embodiments of the present disclosure.

FIG. 8 is a structural diagram showing an example hardware architecture of a computing device capable of implementing the voice processing method, apparatus, and system according to the embodiments of the present disclosure. As shown in FIG. 8, the computing device 800 includes an input device 802, an input interface 804, a central processor 806, a memory 808, an output interface 810, and an output device 812. The input interface 804, the central processor 806, the memory 808, and the output interface 810 are mutually connected using a bus 814. The input device 802 and the output device 812 are connected to the bus 814 via the input interface 804 and the output interface 810 respectively, and then connected to other components of the computing device 800.

For example, the input device 802 receives external input information, and transmits the input information to the central processor 806 via the input interface 804. The central processor 806 processes the input information based on computer executable instructions stored in the memory 808 to generate output information, temporarily or permanently stores the output information in the memory 808, and then transmits the output information to the output device 812 via the output interface 810. The output device 812 outputs the output information to the external of the computing device 800 for use by users.

In other words, the computing device shown in FIG. 8 may also be implemented as including: a memory storing computer-executable instructions therein, and a processor which may, when executing the computer-executable instructions, implement the voice processing method and apparatus as described in conjunction with FIGS. 1-7.

Finally, it should be noted that the above embodiments are only used to illustrate the technical solutions of the present disclosure, rather than limiting the technical solutions of the present disclosure. Although the present disclosure has been described in detail with reference to the foregoing embodiments, those of ordinary skill in the art should understand that the technical solutions recited in the foregoing embodiments may still be modified, or some or all of the technical features thereof may be replaced with equivalents. These modifications or replacement do not make the essence of the corresponding technical solutions to deviate from the scope of the technical solutions of the embodiments of the present disclosure, and still fall within the protection scope of the present disclosure.

The present disclosure may further be understood with clauses as follows.

Clause 1. A voice processing method, comprising:
searching, on the basis of a voiceprint feature of a speaker, for an identifier of the speaker in a speaker registry, the voiceprint feature of the speaker being a parameter obtained according to a voice signal of the speaker captured by a microphone array;
if position information corresponding to the identifier of the speaker in the speaker registry is different from position information of the speaker, updating the speaker registry, the position information of the speaker being a parameter obtained according to the voice signal of the speaker captured by the microphone array; and
labeling the voice signal of the speaker with the identifier of the speaker, so as to track the speaker.

Clause 2. The voice processing method according to clause 1, wherein after the searching, on the basis of the voiceprint feature of the speaker, for the identifier of the speaker in the speaker registry, the method further comprises:
if the position information corresponding to the identifier of the speaker in the speaker registry is identical to the position information of the speaker, labeling the voice signal of the speaker with the identifier of the speaker, so as to track the speaker.

Clause 3. The voice processing method according to clause 1, further comprising:
if the identifier of the speaker is not found in the speaker registry on the basis of the voiceprint feature of the speaker, adding the voiceprint feature of the speaker, the position information of the speaker, and the identifier of the speaker to the speaker registry, so as to track the speaker.

Clause 4. The voice processing method according to clause 1, wherein after the searching, on the basis of the voiceprint feature of the speaker, for the identifier of the speaker in the speaker registry, the method further comprises:
if, on the basis of the voiceprint feature of the speaker, a registration time of the voiceprint feature found in the speaker registry occurs earlier than a preset time threshold, updating the speaker registry by using the voiceprint feature of the speaker.

Clause 5. The voice processing method according to clause 1, further comprising:
if whether the voiceprint feature of the speaker is found in the speaker registry is undecided, buffering the voice signal.

Clause 6. The voice processing method according to clause 1, further comprising:
if position information of one set of voice signals is different from position information of a previous set of voice signals, integrating, according to registration times of voiceprint features in the speaker registry, the voiceprint features in the speaker registry, the set of voice signals comprising one or more of the voice signals.

Clause 7. The voice processing method according to any one of clauses 1 to 3, wherein before the searching, on the basis of the voiceprint feature of the speaker, for the identifier of the speaker in the speaker registry, the method further comprises:
determining that a similarity between position information of one set of voice signals and position information of a previous set of voice signals is larger than or equal to a maximum similarity threshold, and the speaker registry is not completely filled with speaker voiceprint features stored therein.

Clause 8. The voice processing method according to clause 1 or 2, wherein before the searching, on the basis of the voiceprint feature of the speaker, for the identifier of the speaker in the speaker registry, the method further comprises:
determining that a similarity between position information of one set of voice signals and position information of a previous set of voice signals is larger than or equal to a maximum similarity threshold, and the speaker registry is completely filled with speaker voiceprint features stored therein.

Clause 9. The voice processing method according to clause 6, wherein the position information of the set of voice signals being different from the position information of the previous set of voice signals comprises:

a similarity between the position information of the set of voice signals and the position information of the previous set of voice signals being less than a maximum similarity threshold and greater than a minimum similarity threshold.

Clause 10. A voice processing system, wherein the voice processing system comprises: an acoustic sensor and a voice processing device, the acoustic sensor being coupled to the voice processing device, wherein the acoustic sensor is configured to capture a voice signal of a speaker, and the voice processing device is configured to receive the voice signal of the speaker, and acquire a voiceprint feature of the speaker and position information of the speaker, search for an identifier of the speaker in a speaker registry on the basis of the voiceprint feature of the speaker, update the speaker registry if position information corresponding to the identifier of the speaker in the speaker registry is different from the position information of the speaker, and label the voice signal of the speaker with the identifier of the speaker, so as to track the speaker.

Clause 11. The voice processing system according to clause 10, wherein the voice processing device is further configured to determine that the position information corresponding to the identifier of the speaker in the speaker registry is identical to the position information of the speaker, and label the voice signal of the speaker with the identifier of the speaker, so as to track the speaker.

Clause 12. The voice processing system according to clause 10, wherein the voice processing device is further configured to determine that the identifier of the speaker is not found in the speaker registry on the basis of the voiceprint feature of the speaker, and add the voiceprint feature of the speaker, the position information of the speaker, and the identifier of the speaker to the speaker registry, so as to track the speaker.

Clause 13. The voice processing system according to clause 10, wherein the voice processing device is further configured to determine that, on the basis of the voiceprint feature of the speaker, a registration time of the voiceprint feature found in the speaker registry occurs earlier than a preset time threshold, and update the speaker registry by using the voiceprint feature of the speaker.

Clause 14. The voice processing system according to clause 10, wherein the voice processing device is configured to determine whether the voiceprint feature of the speaker is found in the speaker registry is undecided, and buffer the voice signal.

Clause 15. The voice processing system according to clause 10, wherein the voice processing device is configured to determine that position information of one set of voice signals is different from position information of a previous set of voice signals, and integrate, according to registration times of voiceprint features in the speaker registry, the voiceprint features in the speaker registry, the set of voice signals comprising one or more of the voice signals.

Clause 16. The voice processing system according to any one of clauses 10 to 12, wherein the voice processing device is configured to determine that a similarity between position information of one set of voice signals and position information of a previous set of voice signals is larger than or equal to a maximum similarity threshold, and the speaker registry is not completely filled with speaker voiceprint features stored therein.

Clause 17. The voice processing system according to clause 10 or 11, wherein the voice processing device is configured to determine that a similarity between position information of one set of voice signals and position information of a previous set of voice signals is larger than or equal to a maximum similarity threshold, and the speaker registry is completely filled with speaker voiceprint features stored therein.

Clause 18. The voice processing system according to clause 14, wherein the voice processing device is configured to determine that a similarity between position information of a set of voice signals and position information of a previous set of voice signals being less than a maximum similarity threshold and greater than a minimum similarity threshold.

Clause 19. A voice processing apparatus, comprising:

a searching module, configured to search, on the basis of a voiceprint feature of a speaker, for an identifier of the speaker in a speaker registry, the voiceprint feature of the speaker being a parameter obtained according to a voice signal of the speaker captured by a microphone array;

an updating module, configured to update the speaker registry if position information corresponding to the identifier of the speaker in the speaker registry is different from position information of the speaker, the position information of the speaker being a parameter obtained according to the voice signal of the speaker captured by the microphone array; and a labeling module, configured to label the voice signal of the speaker with the identifier of the speaker, so as to track the speaker.

Clause 20. A voice processing apparatus, comprising:
a memory, configured to store a program; and
a processor, configured to run the program stored in the memory to execute the voice processing method according to any one of clauses 1-9.

Clause 21. A computer-readable storage medium having computer program instructions stored thereon which, when executed by a processor, implement the voice processing method according to any one of clauses 1-9.

What is claimed is:

1. A method comprising:

searching, on the basis of a voiceprint feature of a speaker, for an identifier of the speaker in a speaker registry, the voiceprint feature of the speaker including a parameter obtained according to a voice signal of the speaker captured by a microphone array, the parameter including a lexical feature of a language spoken by the speaker;

in response to determining that position information corresponding to the identifier of the speaker in the speaker registry is different from position information of the speaker, updating the speaker registry, the position information of the speaker including another parameter obtained according to the voice signal of the speaker captured by the microphone array; and labeling the voice signal of the speaker with the identifier of the speaker to track the speaker.

2. The method according to claim 1, wherein after the searching, on the basis of the voiceprint feature of the speaker, for the identifier of the speaker in the speaker registry, the method further comprises:

in response to determining that the position information corresponding to the identifier of the speaker in the speaker registry is identical to the position information of the speaker, labeling the voice signal of the speaker with the identifier of the speaker, so as to track the speaker.

3. The method according to claim 1, further comprising:
in response to determining that the identifier of the speaker is not found in the speaker registry on the basis of the voiceprint feature of the speaker, adding the voiceprint feature of the speaker, the position information of the speaker, and the identifier of the speaker to the speaker registry, so as to track the speaker.

4. The method according to claim 1, wherein after the searching, on the basis of the voiceprint feature of the speaker, for the identifier of the speaker in the speaker registry, the method further comprises:
in response to determining that, on the basis of the voiceprint feature of the speaker, a registration time of the voiceprint feature found in the speaker registry occurs earlier than a preset time threshold, updating the speaker registry by using the voiceprint feature of the speaker.

5. The method according to claim 1, further comprising:
in response to determining that the voiceprint feature of the speaker is found in the speaker registry is undecided, buffering the voice signal.

6. The method according to claim 1, further comprising:
in response to determining that position information of one set of voice signals is different from position information of a previous set of voice signals, integrating, according to registration times of voiceprint features in the speaker registry, the voiceprint features in the speaker registry, the set of voice signals comprising one or more of the voice signals.

7. The method according to claim 6, wherein the determining that position information of one set of voice signals is different from position information of a previous set of voice signals comprises:
determining that a similarity between the position information of the set of voice signals and the position information of the previous set of voice signals being less than a maximum similarity threshold and greater than a minimum similarity threshold.

8. The method according to claim 1, wherein before the searching, on the basis of the voiceprint feature of the speaker, for the identifier of the speaker in the speaker registry, the method further comprises:
determining that a similarity between position information of one set of voice signals and position information of a previous set of voice signals is larger than or equal to a maximum similarity threshold, and the speaker registry is not completely filled with speaker voiceprint features stored therein.

9. The method according to claim 1, wherein before the searching, on the basis of the voiceprint feature of the speaker, for the identifier of the speaker in the speaker registry, the method further comprises:
determining that a similarity between position information of one set of voice signals and position information of a previous set of voice signals is larger than or equal to a maximum similarity threshold, and the speaker registry is completely filled with speaker voiceprint features stored therein.

10. A system comprising:
an acoustic sensor and a voice processing device, the acoustic sensor being coupled to the voice processing device,
wherein:
the acoustic sensor is configured to capture a voice signal of a speaker; and
the voice processing device is configured to:
receive the voice signal of the speaker, and acquire a voiceprint feature of the speaker and position information of the speaker, the voiceprint feature including a lexical feature of a language spoken by the speaker;
search for an identifier of the speaker in a speaker registry on the basis of the voiceprint feature of the speaker;
update the speaker registry in response to determining that position information corresponding to the identifier of the speaker in the speaker registry is different from the position information of the speaker; and
label the voice signal of the speaker with the identifier of the speaker, so as to track the speaker.

11. The system according to claim 10, wherein the voice processing device is further configured to:
determine that the position information corresponding to the identifier of the speaker in the speaker registry is identical to the position information of the speaker; and
label the voice signal of the speaker with the identifier of the speaker, so as to track the speaker.

12. The system according to claim 10, wherein the voice processing device is further configured to:
determine that the identifier of the speaker is not found in the speaker registry on the basis of the voiceprint feature of the speaker; and
add the voiceprint feature of the speaker, the position information of the speaker, and the identifier of the speaker to the speaker registry, so as to track the speaker.

13. The system according to claim 10, wherein the voice processing device is further configured to:
determine that, on the basis of the voiceprint feature of the speaker, a registration time of the voiceprint feature found in the speaker registry occurs earlier than a preset time threshold; and
update the speaker registry by using the voiceprint feature of the speaker.

14. The system according to claim 10, wherein the voice processing device is configured to:
determine whether the voiceprint feature of the speaker is found in the speaker registry is undecided; and
buffer the voice signal.

15. The system according to claim 14, wherein the voice processing device is configured to determine that a similarity between position information of a set of voice signals and position information of a previous set of voice signals being less than a maximum similarity threshold and greater than a minimum similarity threshold.

16. The system according to claim 10, wherein the voice processing device is configured to determine that position information of one set of voice signals is different from position information of a previous set of voice signals, and integrate, according to registration times of voiceprint features in the speaker registry, the voiceprint features in the speaker registry, the set of voice signals comprising one or more of the voice signals.

17. The system according to claim 10, wherein the voice processing device is configured to determine that a similarity between position information of one set of voice signals and position information of a previous set of voice signals is larger than or equal to a maximum similarity threshold, and the speaker registry is not completely filled with speaker voiceprint features stored therein.

18. The system according to claim 10, wherein the voice processing device is configured to determine that a similarity between position information of one set of voice signals and position information of a previous set of voice signals is larger than or equal to a maximum similarity threshold, and the speaker registry is completely filled with speaker voiceprint features stored therein.

19. An apparatus comprising:
one or more processors; and
one or more memories storing thereon computer-readable instructions that, when executed by the one or more processors, cause the one or more processors to perform acts comprising:
searching, on the basis of a voiceprint feature of a speaker, for an identifier of the speaker in a speaker registry, the voiceprint feature of the speaker including a parameter obtained according to a voice signal of the speaker captured by a microphone array and processed by a state machine including the following five states including a fuzzy state, a determined state, a critical state, a stable state, and a delay state;
in response to determining that position information corresponding to the identifier of the speaker in the speaker registry is different from position information of the speaker, updating the speaker registry, the position information of the speaker including another parameter obtained according to the voice signal of the speaker captured by the microphone array; and
labeling the voice signal of the speaker with the identifier of the speaker to track the speaker.

20. The apparatus according to claim 19, wherein after the searching, on the basis of the voiceprint feature of the speaker, for the identifier of the speaker in the speaker registry, the method further comprises:
in response to determining that the position information corresponding to the identifier of the speaker in the speaker registry is identical to the position information of the speaker, labeling the voice signal of the speaker with the identifier of the speaker, so as to track the speaker.

* * * * *